US012179336B1

(12) United States Patent
Lin

(10) Patent No.: US 12,179,336 B1
(45) Date of Patent: Dec. 31, 2024

(54) HAND TOOL RACK

(71) Applicant: Yu-Wei Lin, Taichung (TW)

(72) Inventor: Yu-Wei Lin, Taichung (TW)

( * ) Notice: Subject to any disclaimer, the term of this patent is extended or adjusted under 35 U.S.C. 154(b) by 0 days.

(21) Appl. No.: 18/520,240

(22) Filed: Nov. 27, 2023

(30) Foreign Application Priority Data

Jul. 31, 2023 (TW) ................................ 112128629

(51) Int. Cl.
*B25H 3/04* (2006.01)

(52) U.S. Cl.
CPC ..................................... *B25H 3/04* (2013.01)

(58) Field of Classification Search
CPC ........... B25B 13/06; B25B 13/56; B25H 3/00; B25H 3/003; B25H 3/006; B25H 3/04
USPC ........................................................ 211/70.6
See application file for complete search history.

(56) References Cited

U.S. PATENT DOCUMENTS

| | | | | | |
|---|---|---|---|---|---|
| 3,337,058 | A * | 8/1967 | Sandrick | B25H 3/003 | 211/69 |
| 4,619,364 | A * | 10/1986 | Czopor, Jr. | B25H 3/003 | 206/480 |
| 5,512,165 | A * | 4/1996 | Liu | B25H 3/00 | 224/904 |
| 5,918,741 | A * | 7/1999 | Vasudeva | B65D 73/00 | 206/234 |
| 5,951,385 | A * | 9/1999 | Newhouse | B24B 3/265 | 451/344 |
| 6,988,616 | B2 * | 1/2006 | Chen | B25H 3/003 | 206/759 |
| 7,255,229 | B2 * | 8/2007 | Roesler | B25H 3/003 | 206/443 |
| 7,306,099 | B2 * | 12/2007 | Chen | B25H 3/003 | 206/379 |
| 7,537,117 | B2 * | 5/2009 | Roesler | B25H 3/003 | 206/443 |
| 7,624,863 | B2 * | 12/2009 | Meng | B25H 3/003 | 206/349 |
| 7,661,526 | B2 * | 2/2010 | Lin | B25H 3/003 | 206/759 |
| 8,651,348 | B2 * | 2/2014 | Meng | B25H 3/003 | 206/743 |

(Continued)

FOREIGN PATENT DOCUMENTS

| | | | | |
|---|---|---|---|---|
| DE | 202010008128 U1 * | 1/2011 | B25H 3/003 | |
| DE | 102013012240 A1 * | 1/2015 | A47L 5/365 | |

(Continued)

*Primary Examiner* — Patrick D Hawn
(74) *Attorney, Agent, or Firm* — Muncy, Geissler, Olds & Lowe, P.C.

(57) ABSTRACT

A hand tool rack includes a first housing having a first pivoting portion, a first connecting portion, a first accommodating portion, and a first hanging hole, and a second housing having a second pivoting portion pivotally connected with the first pivoting portion, a second connecting portion, a second accommodating portion, and a second hanging hole. When the second housing is in the closed position, the first accommodating portion is in communication with the second accommodating portion, and the first hanging hole is not aligned with the second hanging hole. When the second housing is in the open position, the first accommodating portion and the second accommodating portion are open toward the same direction, and the first hanging hole is aligned with the second hanging hole.

10 Claims, 14 Drawing Sheets

(56) References Cited

U.S. PATENT DOCUMENTS

| | | | | |
|---|---|---|---|---|
| 9,180,590 | B1 * | 11/2015 | Ou | B65D 71/00 |
| 9,434,065 | B2 * | 9/2016 | Ou | B25H 3/003 |
| 9,539,720 | B2 * | 1/2017 | Ou | B65D 25/28 |
| 9,573,270 | B2 * | 2/2017 | Ou | B25H 3/003 |
| 9,630,313 | B2 * | 4/2017 | Ou | B25H 3/003 |
| 9,694,489 | B2 * | 7/2017 | Steele | B65D 25/205 |
| 10,364,081 | B1 * | 7/2019 | Lai | B65D 71/50 |
| 11,065,758 | B2 * | 7/2021 | Hyma | B25H 3/02 |
| 2006/0108300 | A1 | 5/2006 | Lin et al. | |
| 2009/0266730 | A1 * | 10/2009 | Lin | B25H 3/003 206/372 |

FOREIGN PATENT DOCUMENTS

| | | | | |
|---|---|---|---|---|
| DE | 202015003688 | U1 * | 9/2015 | B25H 3/003 |
| EP | 3862142 | A1 * | 8/2021 | B25H 3/003 |
| TW | M487190 | U * | 10/2014 | |
| TW | M495275 | U * | 2/2015 | |

* cited by examiner

HAND TOOL RACK

BACKGROUND OF THE INVENTION

The present invention relates to hand tool racks, and more specifically refers to an anti-theft hand tool rack.

U.S. Patent Publication No. US20060108300A1 discloses a hand tool rack, which comprises a rack base with a plurality of tool slots, a handle and a cover, wherein the tool slots are arranged horizontally from top to bottom, while the hand tools are positioned horizontally to have a greater contact area with the rack than if positioned vertically, thereby increasing the stability for tool storage. The cover may be locked to the rack base to ensure the hand tools are not dropped out. Preferably, a safety pin is provided to pass through the cover and the rack base, and the safety pin must be snipped off by using a tool when the hand tools are taken out for the first time, such that the hand tools exhibited in the rack can be more effectively prevented from being stolen.

However, the hand tool rack provides a theft prevention mechanism through the safety pin, for thieves, cutting just one pin can grant them take to all the hand tools. Even with a theft prevention mechanism in place, thieves may still opt to commit the crime.

Thus, a need exists for a hand tool rack to mitigate and/or obviate the above disadvantages.

SUMMARY OF THE INVENTION

An objective of the present invention is to provide a hand tool rack, which includes a first housing and a second housing. The first housing has a first pivoting portion, a first connecting portion, a first accommodating portion, and a first hanging hole. The first pivoting portion and the first connecting portion are respectively disposed on two opposite sides of the first housing in a horizontal direction. The first accommodating portion is disposed between the first pivoting portion and the first connecting portion. The second housing has a second pivoting portion, a second connecting portion, a second accommodating portion, and a second hanging hole. The second pivoting portion and the second connecting portion are respectively disposed on two opposite sides of the second housing in the horizontal direction. The second accommodating portion is disposed between the second pivoting portion and the second connecting portion. The second pivoting portion is pivotally connected with the first pivoting portion, allowing the second housing to pivot relative to the first housing between a closed position and an open position. When the second housing is in the closed position, the second connecting portion is connected to the first connecting portion, the first accommodating portion is in communication with the second accommodating portion, and the first hanging hole is not aligned with the second hanging hole. When the second housing is in the open position, the second connecting portion is detached from the first connecting portion, the first accommodating portion and the second accommodating portion are open toward a same direction, and the first hanging hole is aligned with the second hanging hole.

In an example, the first housing further has a first rear surface and a first front surface opposite to the first rear surface in the horizontal direction. The first pivoting portion is disposed on the first rear surface. The first hanging hole is disposed on the first front surface. The first accommodating portion is provided with a plurality of first clamping arms each of which is connected to one of a plurality of first hooks in the horizontal direction therein. The plurality of first clamping arms are aligned sequentially from a position adjacent to the first rear surface to a position adjacent to the first front surface, and each first hook is disposed on one side of each first clamping arm adjacent to the first rear surface. The second housing further has a second rear surface and a second front surface opposite to the second rear surface in the horizontal direction. The second pivoting portion is disposed on the second rear surface. The second hanging hole is disposed on the second front surface. The second accommodating portion is provided with a plurality of second clamping arms each of which is connected to one of a plurality of second hooks in the horizontal direction therein. The plurality of second clamping arms are aligned sequentially from a position adjacent to the second rear surface to a position adjacent to the second front surface, and each second hook is disposed on one side of each second clamping arm adjacent to the second rear surface.

In an example, the first connecting portion has a limiting recess. The second connecting portion has a limiting flange. When the second housing is in the closed position, the limiting flange is inserted in the limiting recess. When the second housing is in the open position, the limiting flange is detached from the limiting recess.

In an example, the first housing includes a first base and a first cover coupled with the first base. The first pivoting portion, the first rear surface, the plurality of first clamping arms, and the plurality of first hooks are disposed on the first base. The first connecting portion, the first hanging hole, and the first front surface are disposed on the first cover. The second housing includes a second base and a second cover coupled with the second base. The second pivoting portion, the second rear surface, the plurality of second clamping arms, and the plurality of second hooks are disposed on the second base. The second connecting portion, the second hanging hole, and the second front surface are disposed on the second cover.

In an example, the housing further includes an attached member disposed on the first front surface. The attached member has a socketed portion formed on an outer periphery thereof and a plurality of anti-slip flanges extending from the outer periphery thereof. The socketed portion is disposed between the first front surface and the plurality of anti-slip flanges.

In an example, the first housing has an open structure formed at a lower edge thereof in a vertical direction, allowing the first accommodating portion to communicate with the outside thereof. The first hanging hole is arranged above the first accommodating portion in the vertical direction. The second housing has an open structure formed at a lower edge thereof in the vertical direction, allowing the second accommodating portion to communicate with the outside thereof. The second hanging hole is arranged above the second accommodating portion in the vertical direction.

In another example, the first housing further has a first rear surface and a first front surface opposite to the first rear surface in the horizontal direction. The first pivoting portion is disposed on the first rear surface. The second housing further has a second rear surface and a second front surface opposite to the second rear surface in the horizontal direction. The second pivoting portion is disposed on the second rear surface, and at least one anti-theft member has a first end fixed to the first front surface and a second end fixed to second front surface to cause the second housing in the closed position.

In another example, the number of the at least one anti-theft member is two, and each anti-theft member has a first end fixed to the first front surface and a second end fixed to second front surface. One of the two anti-theft members is disposed above the first accommodating portion and the second accommodating portion in a vertical direction, and the other one of the two anti-theft members is disposed below the first accommodating portion and the second accommodating portion in the vertical direction.

In another example, the second accommodating portion is provided with a plurality of first socket seats arranged in a row in a vertical direction. When the second housing is in the closed position, the plurality of first socket seats extends toward the first accommodating portion.

In further another example, the first accommodating portion is provided with a plurality of second socket seats arranged in a row in a vertical direction. When the second housing is in the closed position, the plurality of second socket seats extends toward the second accommodating portion.

The present invention will become clearer in light of the following detailed description of illustrative embodiments of this invention described in connection with the drawings.

DETAILED DESCRIPTION OF THE INVENTION

Figure 1:
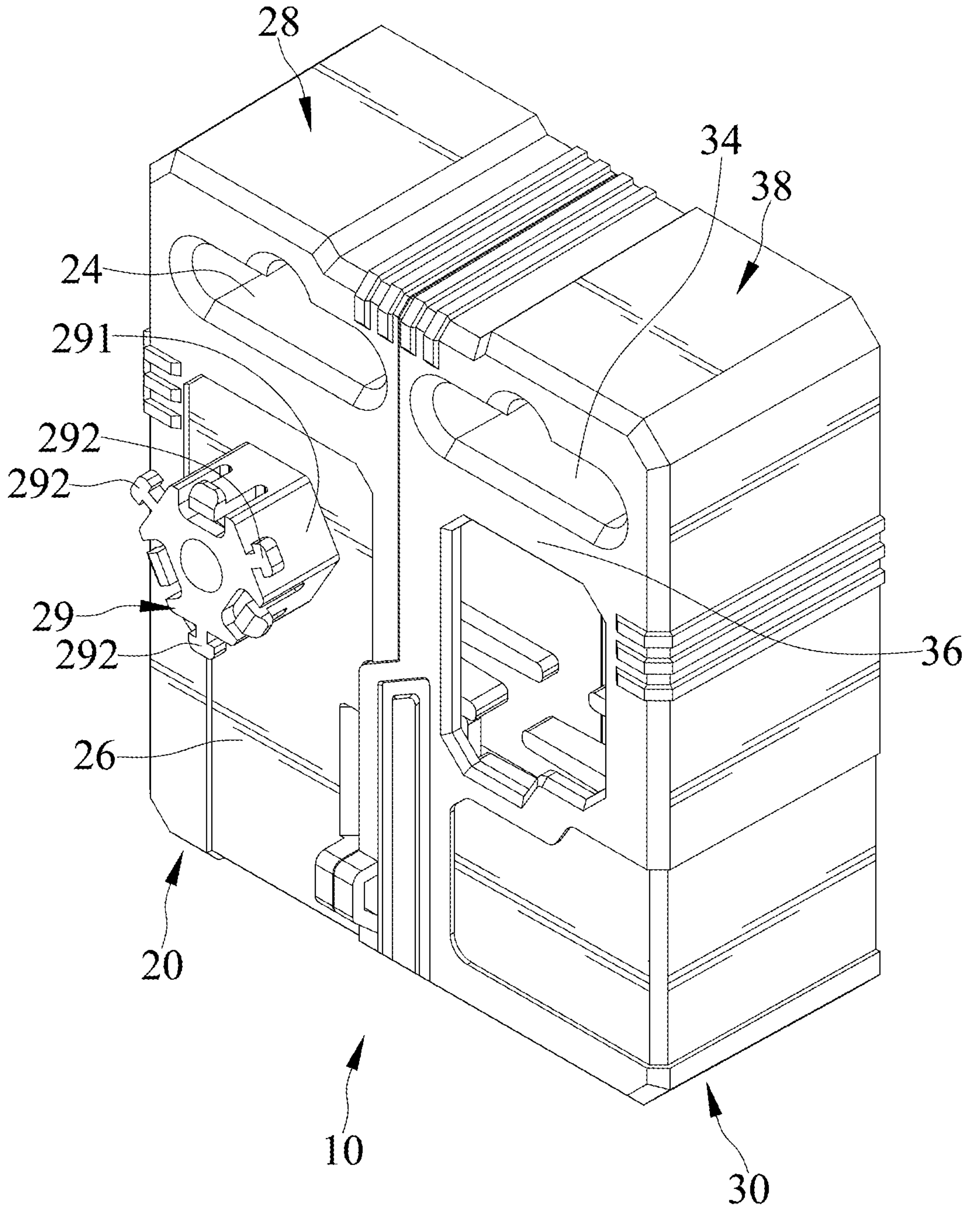
FIG. 1 is a perspective view of a hand tool rack of a first embodiment according to the present invention.
Figure 2:
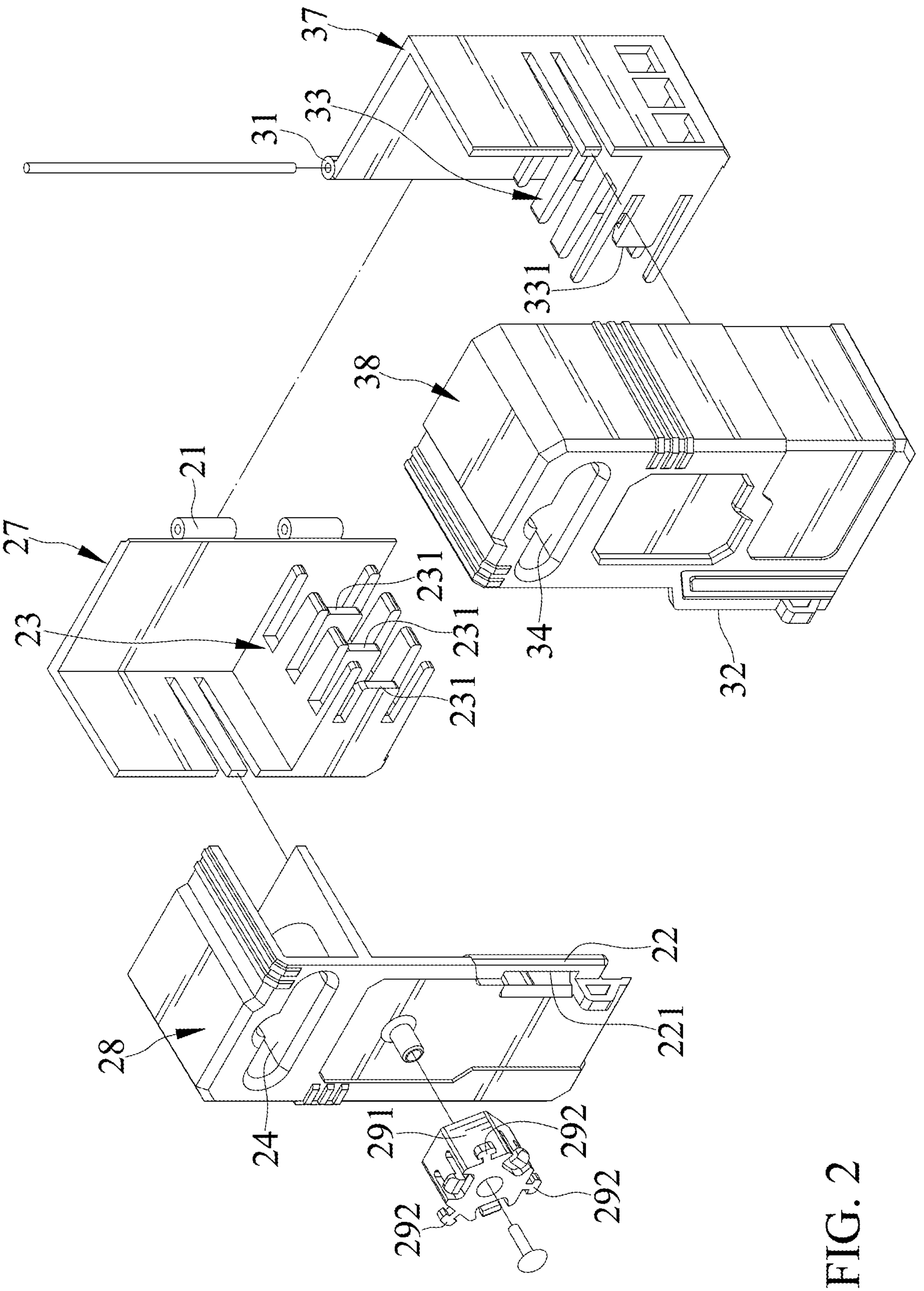
FIG. 2 is an exploded perspective view of the hand tool rack of FIG. 1.
Figure 3:
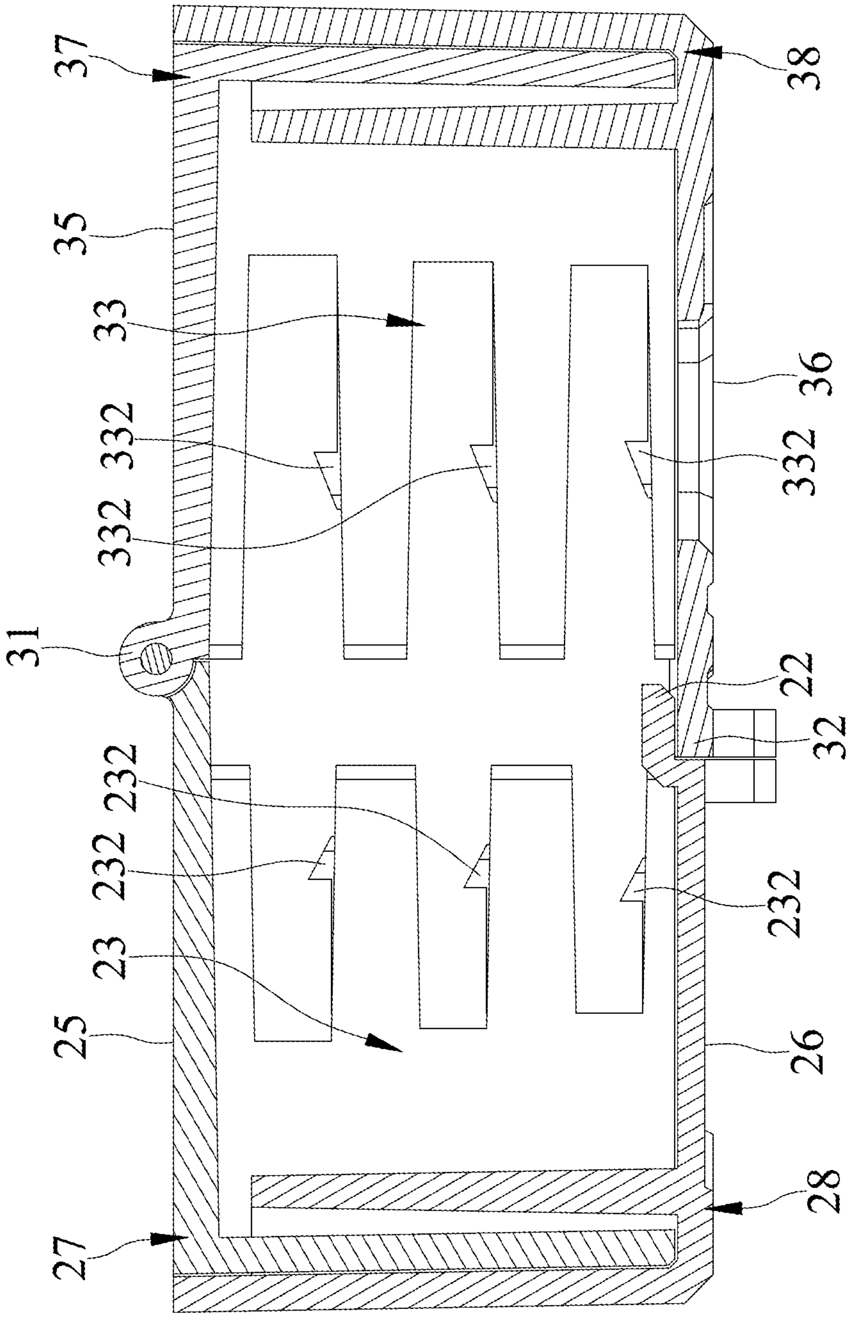
FIG. 3 is a cross sectional view of the hand tool rack of FIG. 1 and shows the second housing in the closed position.
Figure 4:
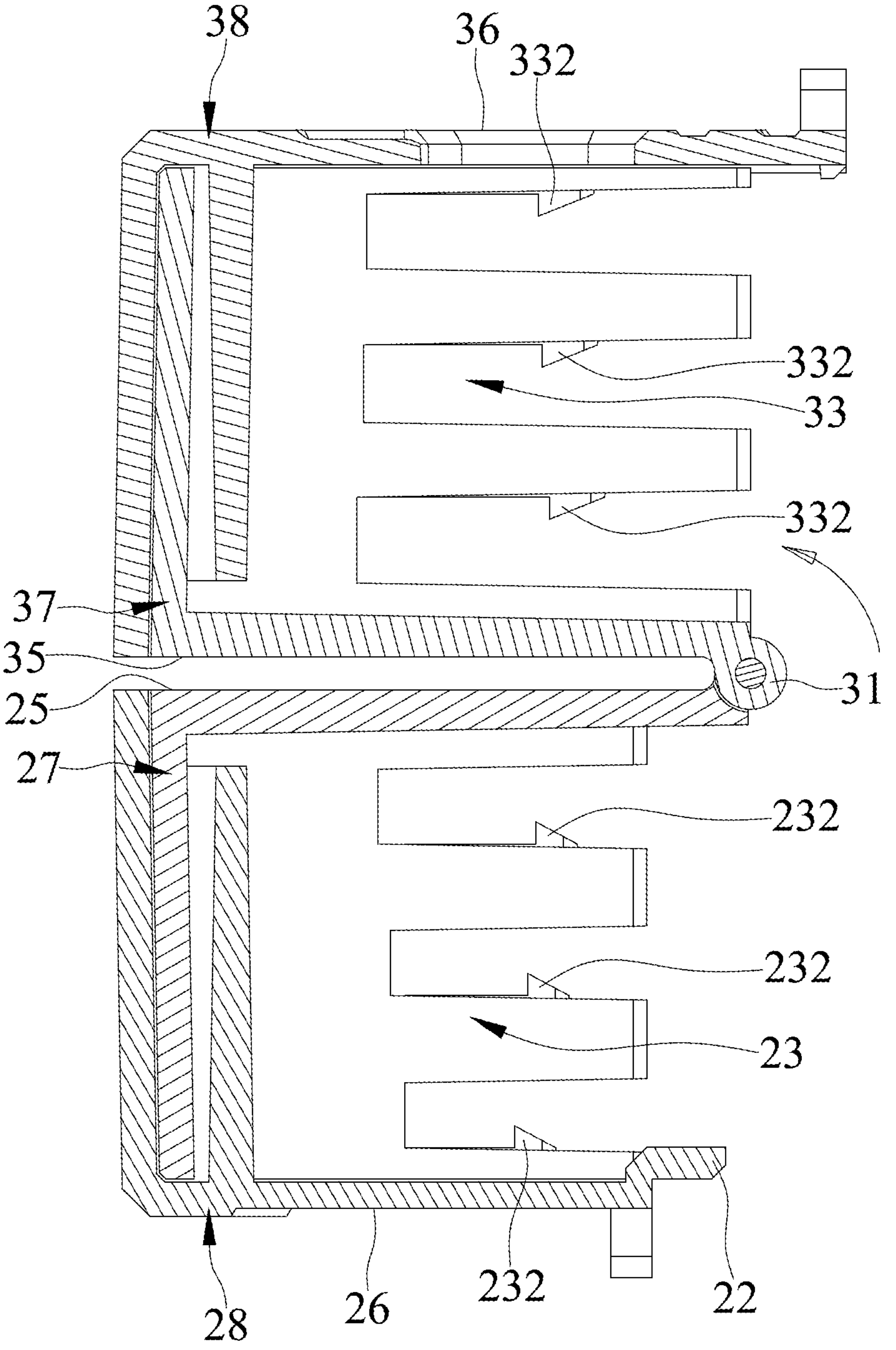
FIG. 4 is another cross sectional view of the hand tool rack of FIG. 1 and shows the second housing in the open position.
Figure 5:
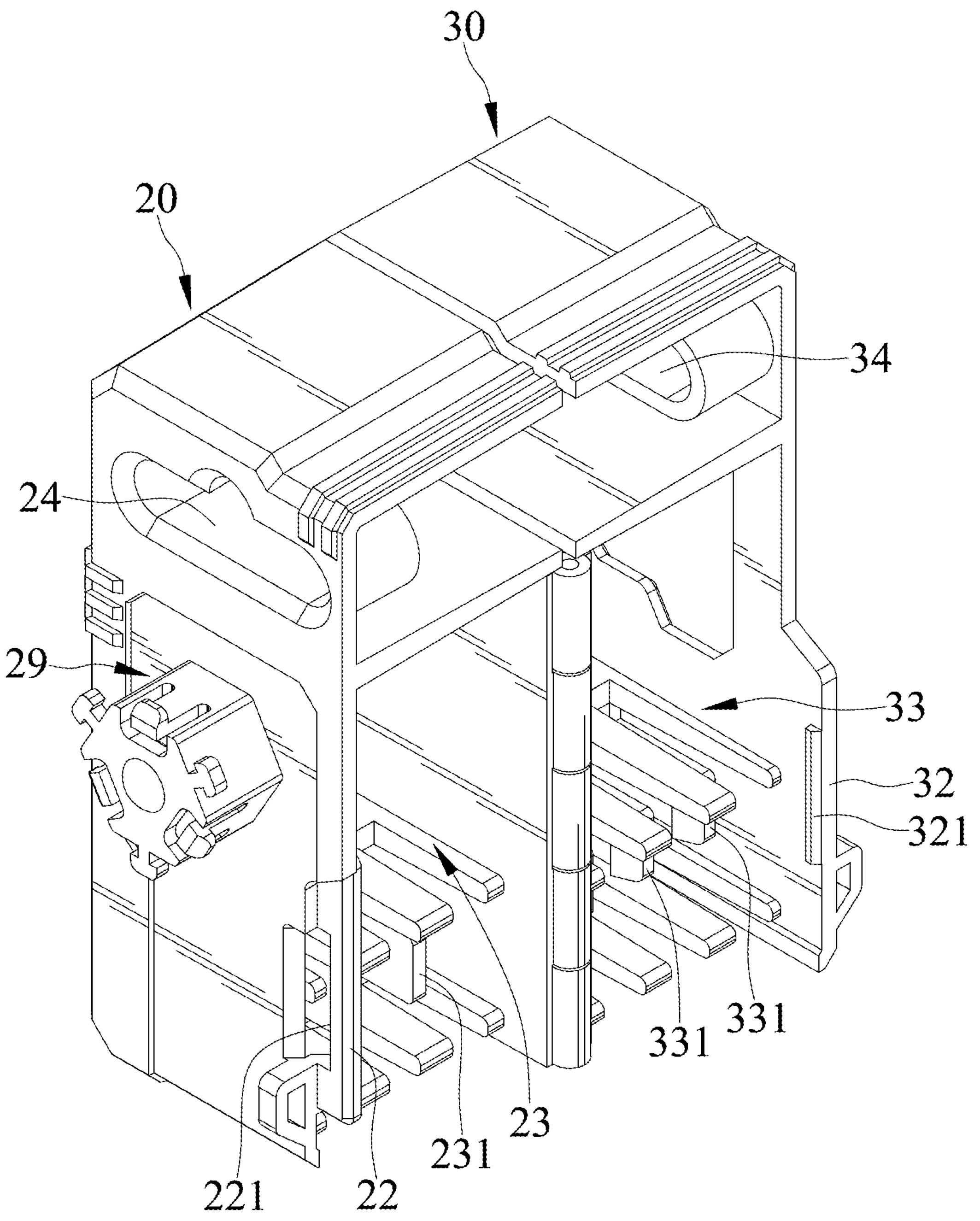
FIG. 5 is another perspective view of the hand tool rack of FIG. 1 and shows the second housing in the open position.
Figure 6:
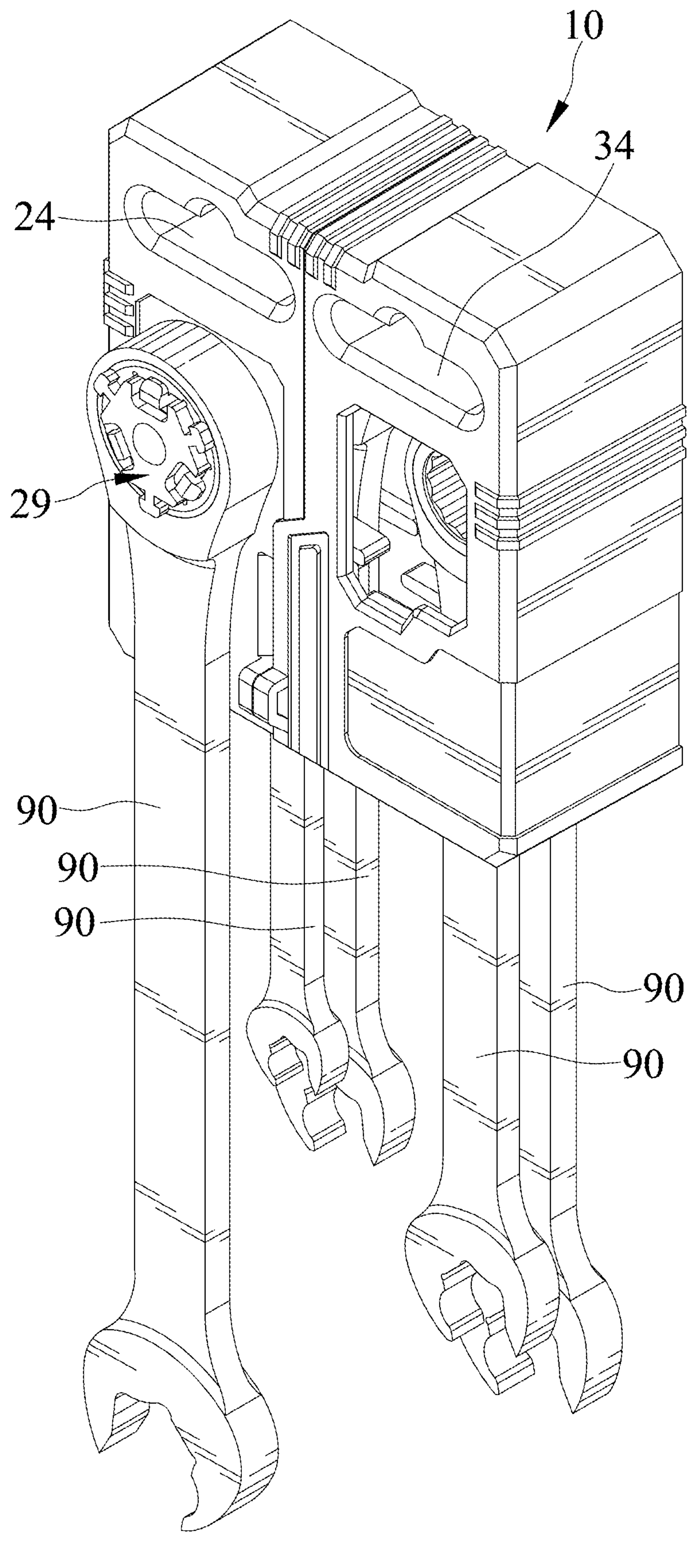
FIG. 6 is another perspective view of the hand tool rack of FIG. 1 and shows wrenches organized thereon when the second housing is in the closed position.
Figure 7:
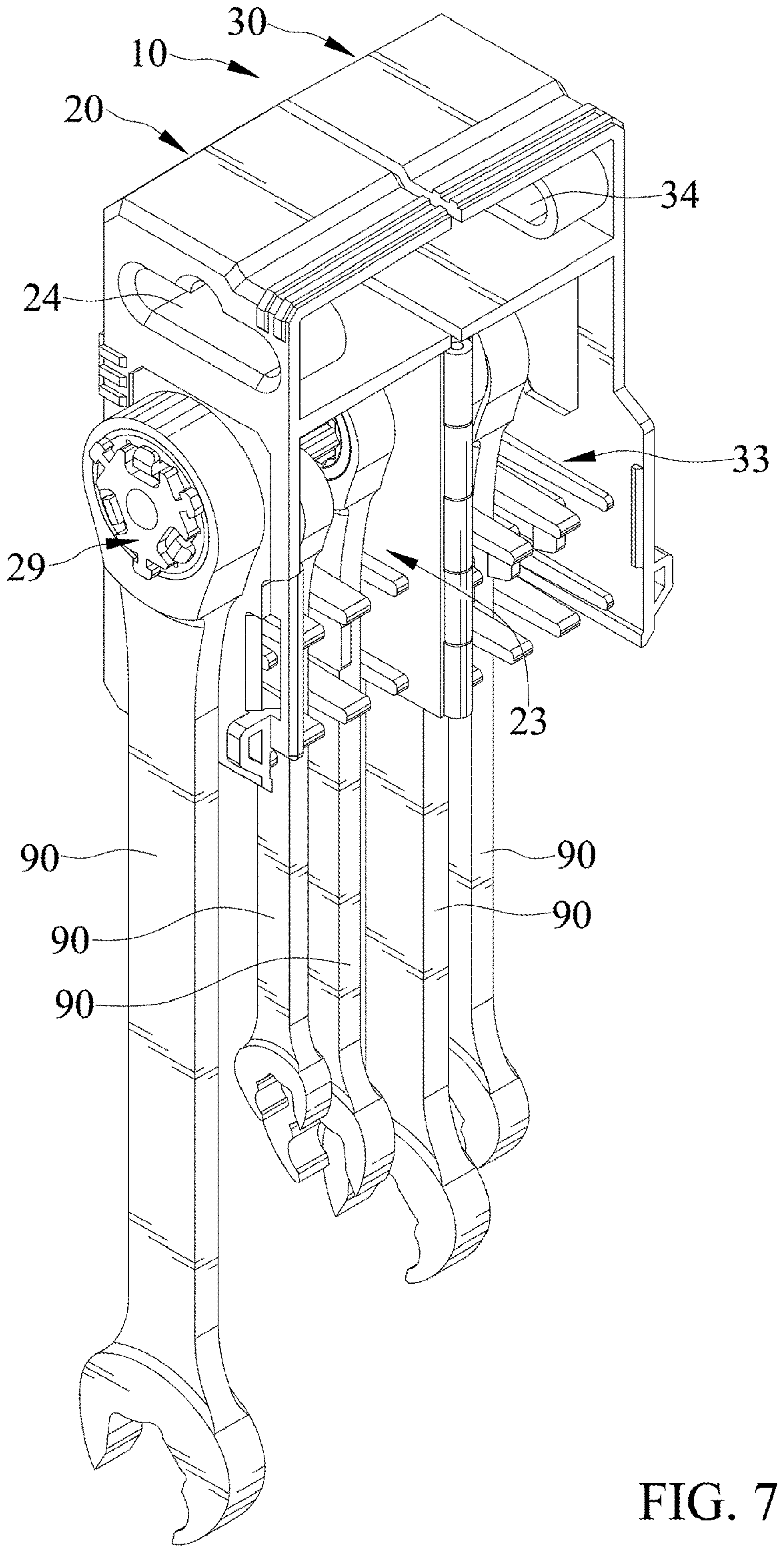
FIG. 7 is another perspective view of the hand tool rack of FIG. 1 and shows wrenches organized thereon when the second housing is in the open position.
Figure 8:
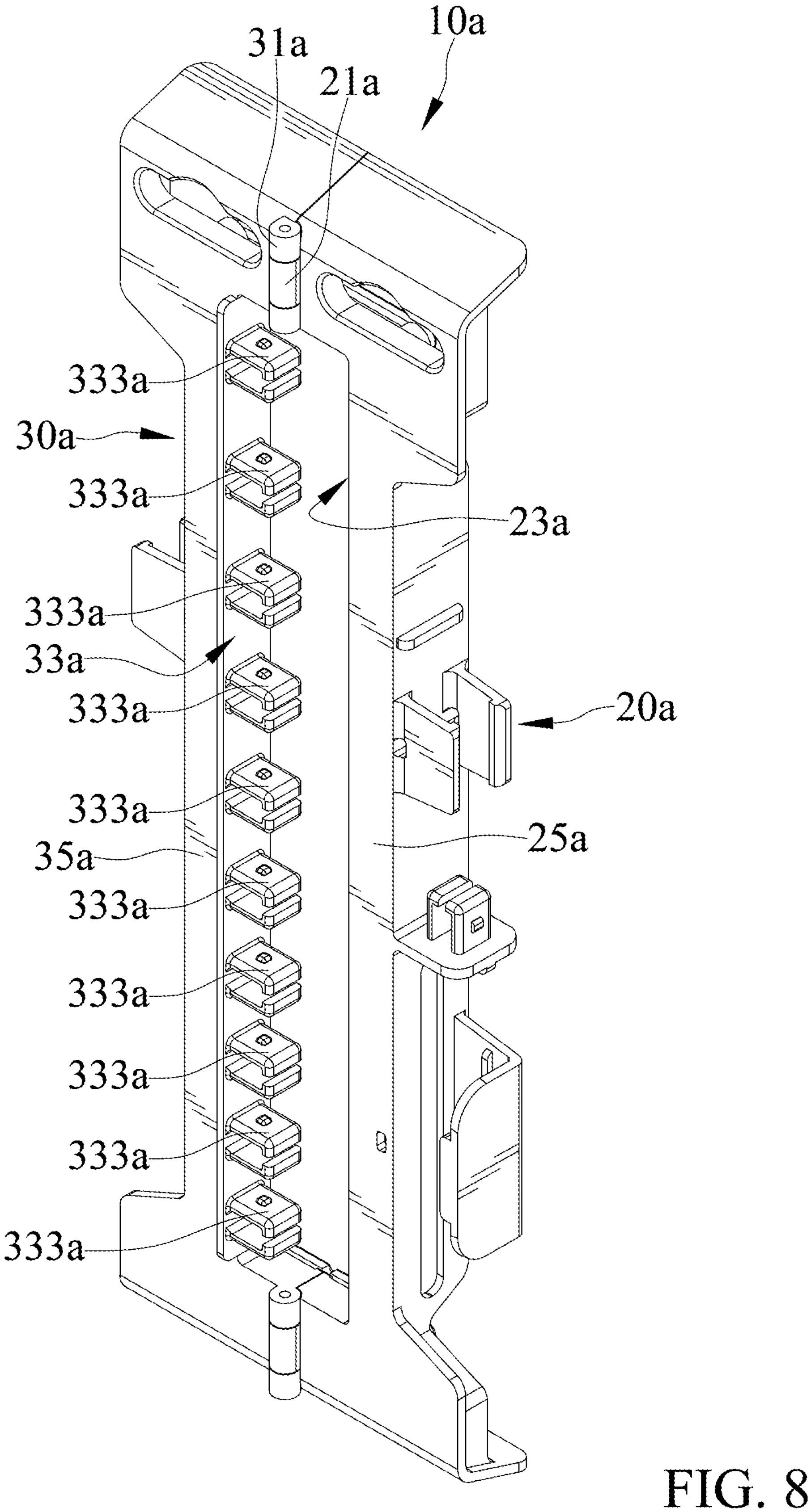
FIG. 8 is a perspective view of a hand tool rack of a second embodiment according to the present invention and shows the second housing in the closed position.
Figure 9:
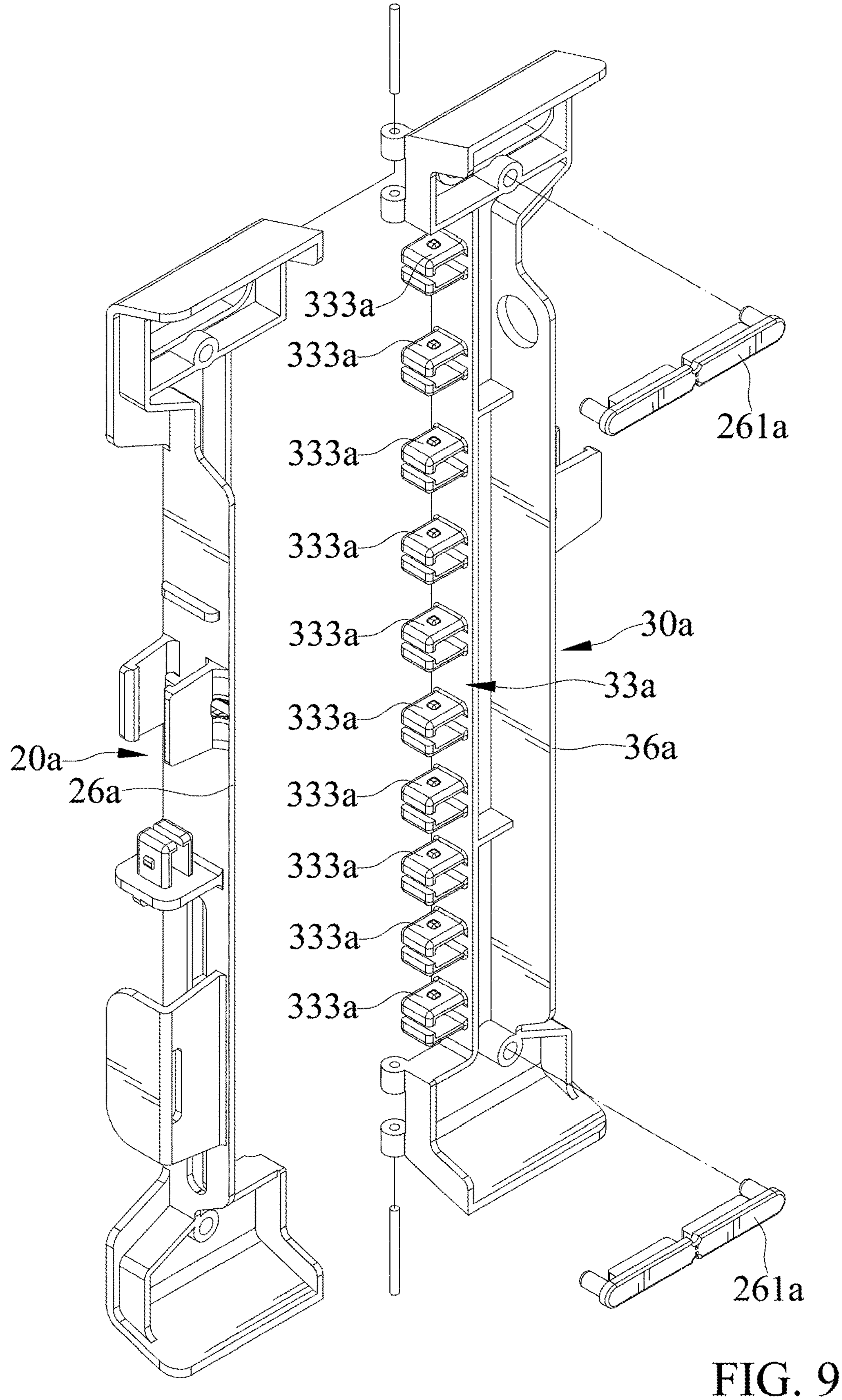
FIG. 9 is an exploded perspective view of the hand tool rack of FIG. 8.
Figure 10:
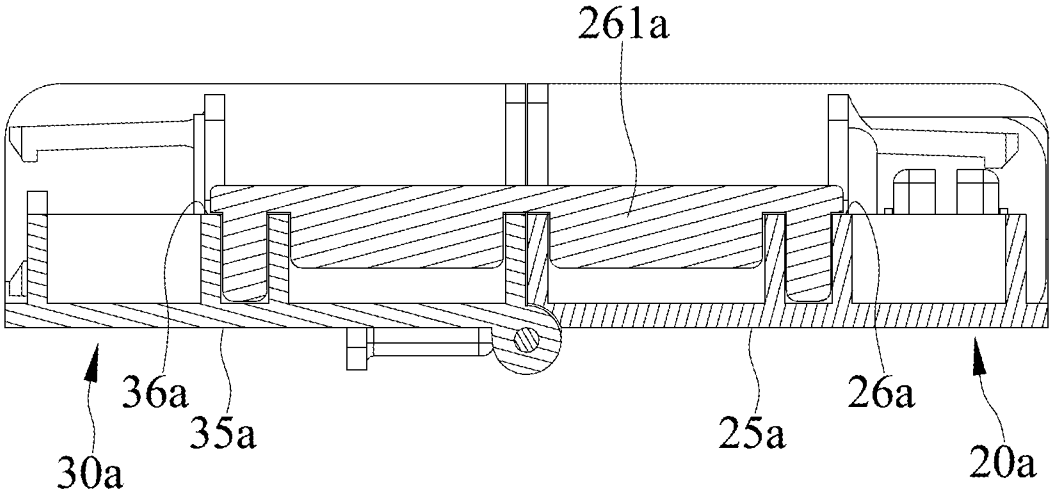
FIG. 10 is a cross sectional view of the hand tool rack of FIG. 8.
Figure 11:
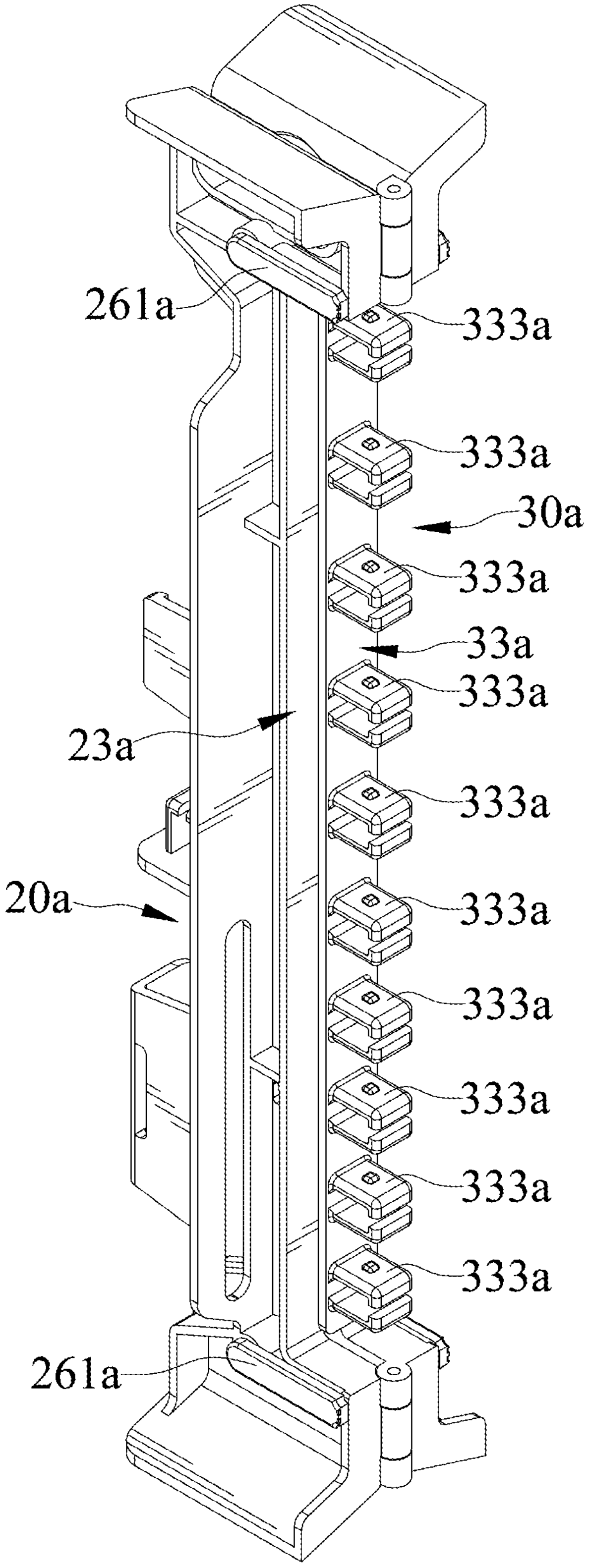
FIG. 11 is another perspective view of the hand tool rack of FIG. 8 and shows the second housing in the open position.

FIGS. 1-7 show a hand tool rack 10 of a first embodiment according to the present invention. The hand tool rack 10 includes a first housing 20 and second housing 30.

The first housing 20 has a first pivoting portion 21, a first connecting portion 22, a first accommodating portion 23, and a first hanging hole 24. The first pivoting portion 21 and the first connecting portion 22 are respectively disposed on two opposite sides of the first housing 20 in a horizontal direction. The first accommodating portion 23 is disposed between the first pivoting portion 21 and the first connecting portion 22.

The second housing 30 has a second pivoting portion 31, a second connecting portion 32, a second accommodating portion 33, and a second hanging hole 34. The second pivoting portion 31 and the second connecting portion 32 are respectively disposed on two opposite sides of the second housing 30 in the horizontal direction. The second accommodating portion 33 is disposed between the second pivoting portion 31 and the second connecting portion 32. The second pivoting portion 31 is pivotally connected with the first pivoting portion 21, allowing the second housing 30 to pivot relative to the first housing 20 between a closed position and an open position. When the second housing 30 is in the closed position, the second connecting portion 32 is connected to the first connecting portion 22, the first accommodating portion 23 is in communication with the second accommodating portion 33, and the first hanging hole 24 is not aligned with the second hanging hole 34. When the second housing 30 is in the open position, the second connecting portion 32 is detached from the first connecting portion 22, the first accommodating portion 23 and the second accommodating portion 33 are open toward a same direction, and the first hanging hole 24 is aligned with the second hanging hole 34.

The first housing 20 further has a first rear surface 25 and a first front surface 26 opposite to the first rear surface 25 in the horizontal direction. The first pivoting portion 21 is disposed on the first rear surface 25. The first hanging hole 24 is disposed on the first front surface 26. The first accommodating portion 23 is provided with a plurality of first clamping arms 231 each of which is connected to one of a plurality of first hooks 232 in the horizontal direction therein. The plurality of first clamping arms 231 are aligned sequentially from a position adjacent to the first rear surface 25 to a position adjacent to the first front surface 26, and each first hook 232 is disposed on one side of each first clamping arm 231 adjacent to the first rear surface 25. The second housing 30 further has a second rear surface 35 and a second front surface 36 opposite to the second rear surface 35 in the horizontal direction. The second pivoting portion 31 is disposed on the second rear surface 35. The second hanging hole 34 is disposed on the second front surface 36. The second accommodating portion 33 is provided with a plurality of second clamping arms 331 each of which is connected to one of a plurality of second hooks 332 in the horizontal direction therein. The plurality of second clamping arms 331 are aligned sequentially from a position adjacent to the second rear surface 35 to a position adjacent to the second front surface 36, and wherein each second hook 332 is disposed on one side of each second clamping arm 331 adjacent to the second rear surface 35.

The first connecting portion 22 has a limiting recess 221. The second connecting portion 32 has a limiting flange 321. When the second housing 30 is in the closed position, the limiting flange 321 is inserted in the limiting recess 221. When the second housing 30 is in the open position, the limiting flange 321 is detached from the limiting recess 221.

The first housing 20 includes a first base 27 and a first cover 28 coupled with the first base 27. The first pivoting portion 21, the first rear surface 25, the plurality of first clamping arms 231, and the plurality of first hooks 232 are disposed on the first base 27. The first connecting portion 22, the first hanging hole 24, and the first front surface 26 are disposed on the first cover 28. The second housing 30 includes a second base 37 and a second cover 38 coupled with the second base 37. The second pivoting portion 31, the second rear surface 35, the plurality of second clamping arms 331, and the plurality of second hooks 332 are disposed on the second base 37. The second connecting portion 32, the second hanging hole 34, and the second front surface 36 are disposed on the second cover 38.

In the embodiment, the housing 20 further includes an attached member 29 disposed on the first front surface 26. The attached member 29 has a socketed portion 291 formed on an outer periphery thereof and a plurality of anti-slip flanges 292 extending from the outer periphery thereof. The socketed portion 291 is disposed between the first front surface 26 and the plurality of anti-slip flanges 292.

The first housing 20 has an open structure formed at a lower edge thereof in a vertical direction, allowing the first accommodating portion 23 to communicate with the outside thereof. The first hanging hole 24 is arranged above the first accommodating portion 23 in the vertical direction. The second housing 30 has an open structure formed at a lower edge thereof in the vertical direction, allowing the second accommodating portion 33 to communicate with the outside thereof. The second hanging hole 34 is arranged above the second accommodating portion 33 in the vertical direction.

Therefore, the hand tool rack 10 is able to provide a good anti-theft effect and a good display effect. Wrenches 90 can be separately stored in the first accommodating portion 23 and the second accommodating portion 33 and secured by the first clamping arms 231 and the second clamping arms 331. In the state where the first cover 28 is coupled with the first base 27, the first clamping arms 231 are unable to twist or deform in the first accommodating portion 23, and users cannot directly remove the wrenches 90. The second clamping arms 331 operate similarly, and not elaborated here. Further, users can open the hand tool rack 10 and directly take out the wrenches 90, which can be socketed on the socketed portion 291, and the anti-slip flanges 292 prevent the wrenches 90 from detaching from the socketed portion 291.

FIGS. 8-11 show a hand tool rack 10*a* of a second embodiment according to the present invention. The second embedment is substantially the same as the first embodiment. The main differences are that the first housing 20*a* further has a first rear surface 25*a* and a first front surface 26*a* opposite to the first rear surface 25*a* in the horizontal direction. The first pivoting portion 21*a* is disposed on the first rear surface 25*a*. The second housing 30*a* further has a second rear surface 35*a* and a second front surface 36*a* opposite to the second rear surface 35*a* in the horizontal direction. The second pivoting portion 31*a* is disposed on the second rear surface 35*a*, and at least one anti-theft member 261*a* has a first end fixed to the first front surface 26*a* and a second end fixed to second front surface 36*a* to cause the second housing 30*a* in the closed position.

In the embodiment, the number of the at least one anti-theft member 261*a* is two, and each of the two anti-theft members 261*a* has a first end fixed to the first front surface 26*a* and a second end fixed to second front surface 36*a*. One of the two anti-theft members 261*a* is disposed above the first accommodating portion 23*a* and the second accommodating portion 33*a* in a vertical direction, and the other one of the two anti-theft members 261*a* is disposed below the first accommodating portion 23*a* and the second accommodating portion 33*a* in the vertical direction.

Further, the second accommodating portion 33*a* is provided with a plurality of first socket seats 333*a* arranged in a row in a vertical direction. When the second housing 30*a* is in the closed position, the plurality of first socket seats 333*a* extends toward the first accommodating portion 23*a*.

Therefore, the hand tool rack 10*a* is designed for displaying sockets, which can be individually connected to the first socket seats 333*a*. When the second housing 30*a* is in the closed position, the sockets are limited by the second housing 30*a* and cannot be removed. The pivot portion of the first housing 20*a* and the second housing 30*a* is positioned at the rear, while the anti-theft members 261*a* is positioned at the front. As long as the anti-theft members 261*a* is not cut or damaged, the second housing 30*a* will remain in the closed position and cannot be opened, achieving a good anti-theft effect.

Figure 12:
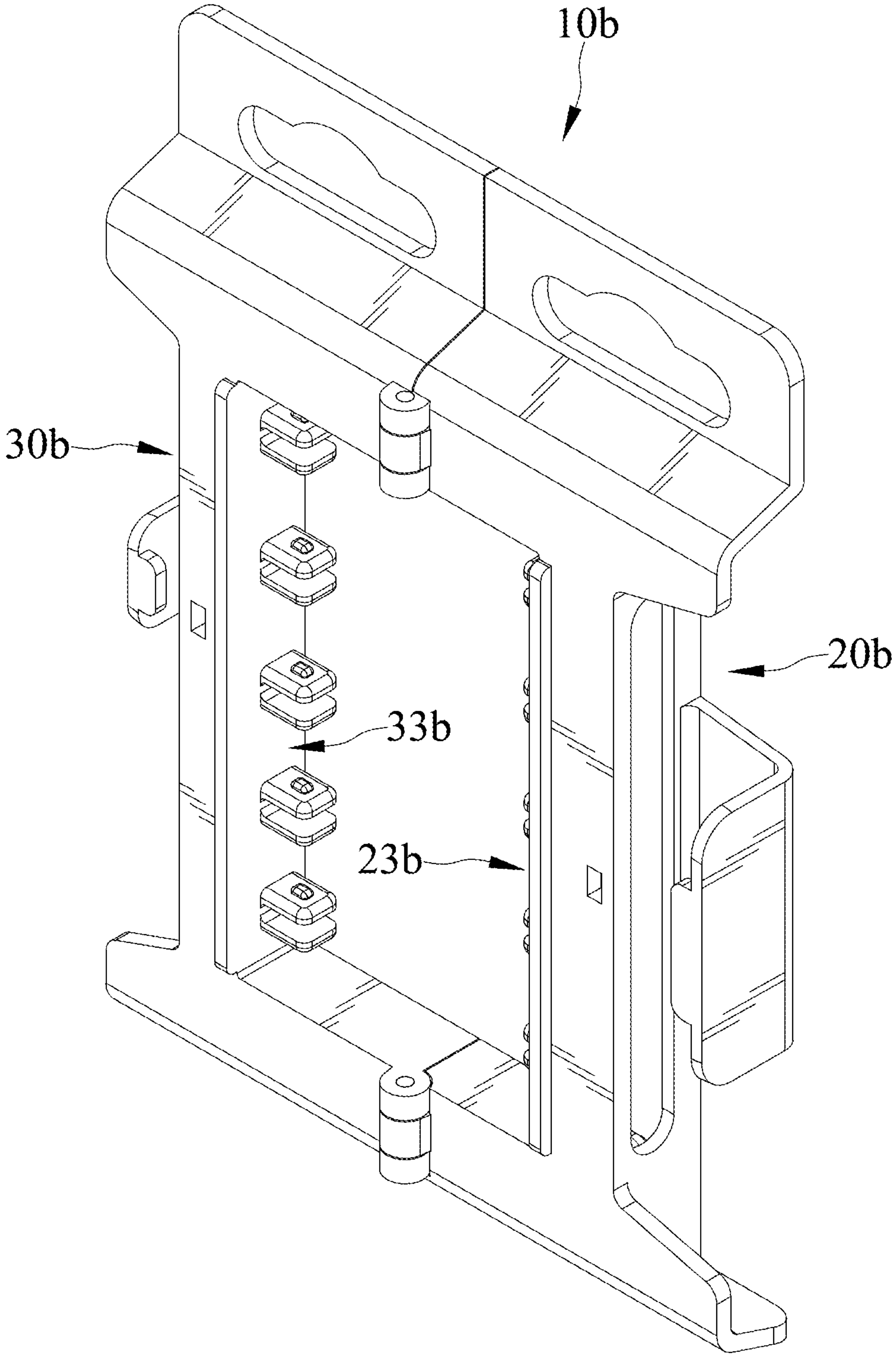
FIG. 12 is another perspective view of the hand tool rack of FIG. 8 and shows the second housing in the closed position.
Figure 13:
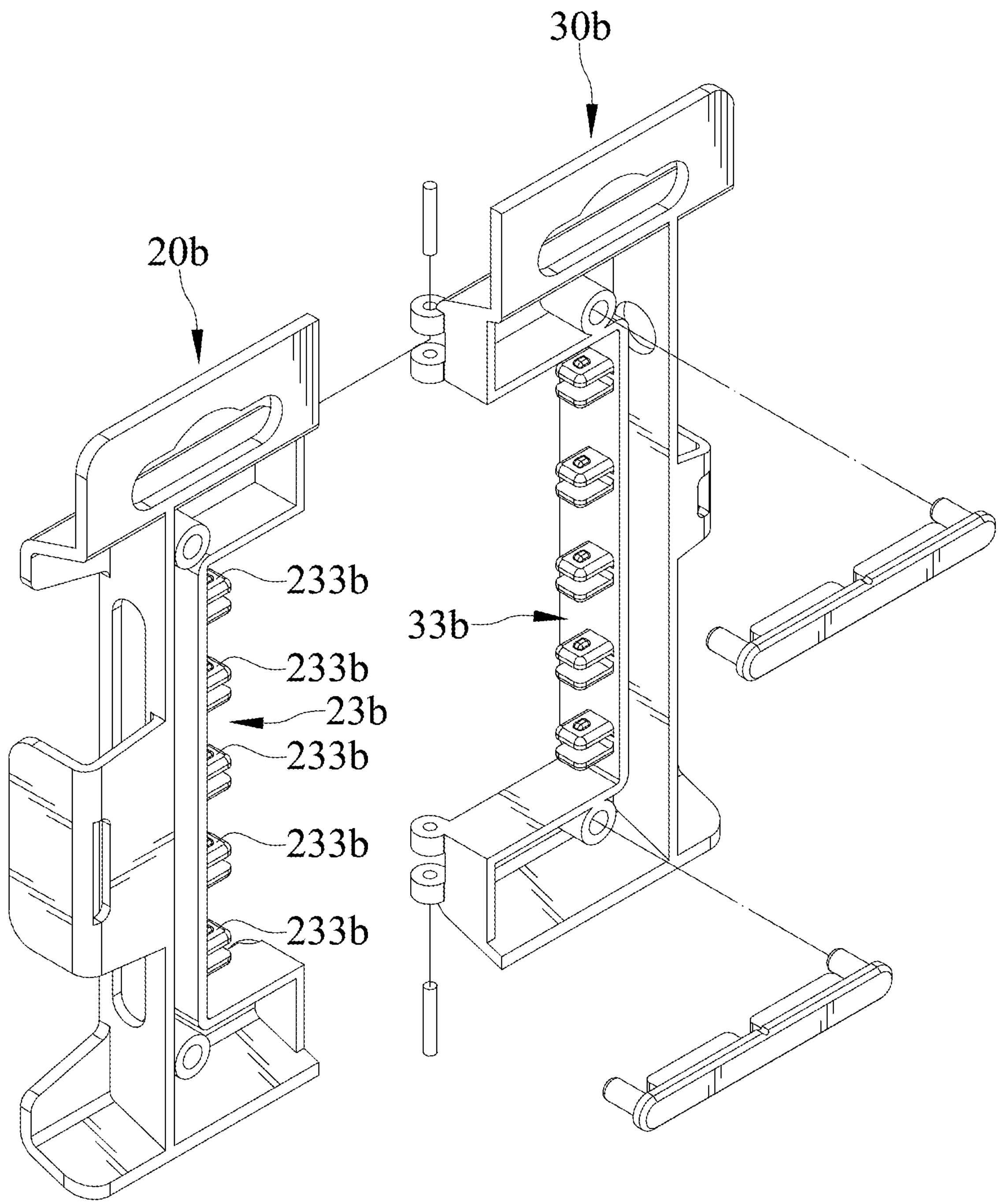
FIG. 13 is an exploded perspective view of the hand tool rack of a third embodiment according to the present invention.
Figure 14:
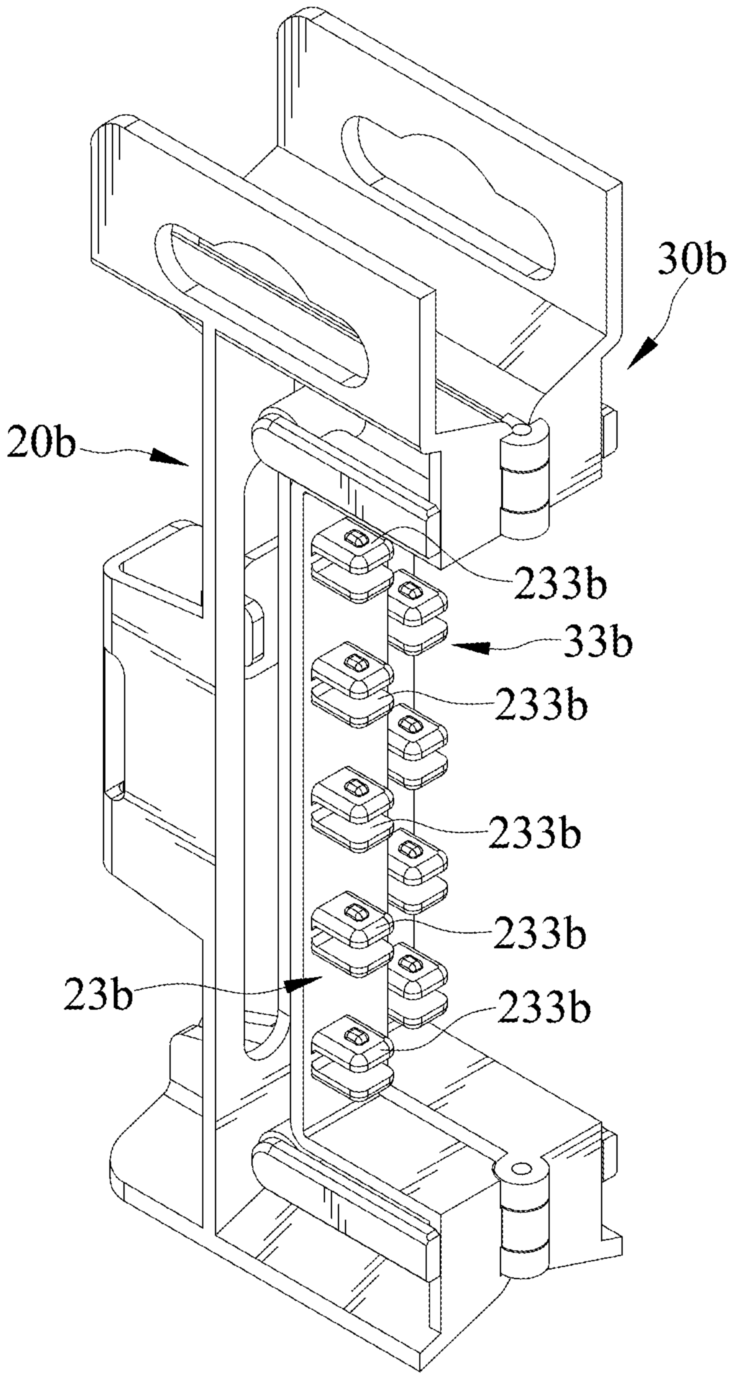
FIG. 14 is another exploded perspective view of the hand tool rack of FIG. 13 and shows the second housing in the open position.

FIGS. 12-14 show a hand tool rack 10*b* of a third embodiment according to the present invention. The third embedment is substantially the same as the second embodiment. The main differences are that the first accommodating portion 23*b* is provided with a plurality of second socket seats 233*b* arranged in a row in a vertical direction. When the second housing 30*b* is in the closed position, the plurality of second socket seats 233*b* extends toward the second accommodating portion 33*b*.

Therefore, both the first housing 20*b* and the second housing 30*b* of the hand tool rack 10*b* can display sockets, increasing the capacity of the hand tool rack 10*b* to accommodate and showcase sockets.

Although specific embodiments have been illustrated and described, numerous modifications and variations are still possible without departing from the scope of the invention. The scope of the invention is limited by the accompanying claims.

The invention claimed is:

1. A hand tool rack comprising:

a first housing having a first pivoting portion, a first connecting portion, a first accommodating portion, and a first hanging hole, wherein the first pivoting portion and the first connecting portion are respectively disposed on two opposite sides of the first housing in a horizontal direction, and wherein the first accommodating portion is disposed between the first pivoting portion and the first connecting portion; and a second housing having a second pivoting portion, a second connecting portion, a second accommodating portion, and a second hanging hole, wherein the second pivoting portion and the second connecting portion are respectively disposed on two opposite sides of the second housing in the horizontal direction, wherein the second accommodating portion is disposed between the second pivoting portion and the second connecting portion, and wherein the second pivoting portion is pivotally connected with the first pivoting portion, allowing the second housing to pivot relative to the first housing between a closed position and an open position;

wherein when the second housing is in the closed position, the second connecting portion is connected to the first connecting portion, the first accommodating portion is in communication with the second accommodating portion, and the first hanging hole is not aligned with the second hanging hole;

wherein when the second housing is in the open position, the second connecting portion is detached from the first connecting portion, the first accommodating portion and the second accommodating portion are open toward a same direction, and the first hanging hole is aligned with the second hanging hole.

2. The hand tool rack as claimed in claim 1, wherein the first housing further has a first rear surface and a first front surface opposite to the first rear surface in the horizontal direction, wherein the first pivoting portion is disposed on the first rear surface, wherein the first hanging hole is disposed on the first front surface, wherein the first accommodating portion is provided with a plurality of first clamping arms each of which is connected to one of a plurality of first hooks in the horizontal direction therein, wherein the plurality of first clamping arms are aligned sequentially from a position adjacent to the first rear surface to a position adjacent to the first front surface, wherein each first hook is disposed on one side of each first clamping arm adjacent to the first rear surface;

wherein the second housing further has a second rear surface and a second front surface opposite to the second rear surface in the horizontal direction, wherein the second pivoting portion is disposed on the second rear surface, wherein the second hanging hole is disposed on the second front surface, wherein the second accommodating portion is provided with a plurality of second clamping arms each of which is connected to one of a plurality of second hooks in the horizontal direction therein, wherein the plurality of second clamping arms are aligned sequentially from a position adjacent to the second rear surface to a position adjacent to the second front surface, and wherein each second hook is disposed on one side of each second clamping arm adjacent to the second rear surface.

3. The hand tool rack as claimed in claim 1, wherein the first connecting portion has a limiting recess, wherein the second connecting portion has a limiting flange;

wherein when the second housing is in the closed position, the limiting flange is inserted in the limiting recess;

wherein when the second housing is in the open position, the limiting flange is detached from the limiting recess.

4. The hand tool rack as claimed in claim 2, wherein the first housing includes a first base and a first cover coupled with the first base, wherein the first pivoting portion, the first rear surface, the plurality of first clamping arms, and the plurality of first hooks are disposed on the first base, wherein the first connecting portion, the first hanging hole, and the first front surface are disposed on the first cover;

wherein the second housing includes a second base and a second cover coupled with the second base, wherein the second pivoting portion, the second rear surface, the plurality of second clamping arms, and the plurality of second hooks are disposed on the second base, and wherein the second connecting portion, the second hanging hole, and the second front surface are disposed on the second cover.

5. The hand tool rack as claimed in claim 4, wherein the housing further includes an attached member disposed on the first front surface, wherein the attached member has a socketed portion formed on an outer periphery thereof and a plurality of anti-slip flanges extending from the outer periphery thereof, and wherein the socketed portion is disposed between the first front surface and the plurality of anti-slip flanges.

6. The hand tool rack as claimed in claim 1, wherein the first housing has an open structure formed at a lower edge thereof in a vertical direction, allowing the first accommodating portion to communicate with the outside thereof, wherein the first hanging hole is arranged above the first accommodating portion in the vertical direction, wherein the second housing has an open structure formed at a lower edge thereof in the vertical direction, allowing the second accommodating portion to communicate with the outside thereof, and wherein the second hanging hole is arranged above the second accommodating portion in the vertical direction.

7. The hand tool rack as claimed in claim 1, wherein the first housing further has a first rear surface and a first front surface opposite to the first rear surface in the horizontal direction, wherein the first pivoting portion is disposed on the first rear surface, wherein the second housing further has a second rear surface and a second front surface opposite to the second rear surface in the horizontal direction, wherein the second pivoting portion is disposed on the second rear surface, and wherein at least one anti-theft member has a first end fixed to the first front surface and a second end fixed to second front surface to cause the second housing in the closed position.

8. The hand tool rack as claimed in claim 7, wherein the number of the at least one anti-theft member is two, wherein each anti-theft member has a first end fixed to the first front surface and a second end fixed to second front surface, wherein one of the two anti-theft members is disposed above the first accommodating portion and the second accommodating portion in a vertical direction, and the other one of the two anti-theft members is disposed below the first accommodating portion and the second accommodating portion in the vertical direction.

9. The hand tool rack as claimed in claim 8, wherein the second accommodating portion is provided with a plurality of first socket seats arranged in a row in a vertical direction;

wherein when the second housing is in the closed position, the plurality of first socket seats extends toward the first accommodating portion.

10. The hand tool rack as claimed in claim 9, wherein the first accommodating portion is provided with a plurality of second socket seats arranged in a row in a vertical direction;

wherein when the second housing is in the closed position, the plurality of second socket seats extends toward the second accommodating portion.

* * * * *